(12) United States Patent
Hoerentrop et al.

(10) Patent No.: US 8,887,094 B1
(45) Date of Patent: *Nov. 11, 2014

(54) METHOD FOR GENERATING AN ON-SCREEN MENU

(71) Applicant: Thomson Licensing, Issy de Moulineaux (FR)

(72) Inventors: Jobst Hoerentrop, Wenningsen (DE); Dirk Gandolph, Ronnenberg (DE); Carsten Herpel, Wenningsen (DE); Ralf Ostermann, Hannover (DE); Hartmut Peters, Barsinghausen (DE)

(73) Assignee: Thomson Licensing, Boulogne-Billacourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,809

(22) Filed: Apr. 9, 2014

Related U.S. Application Data

(63) Continuation of application No. 13/900,666, filed on May 23, 2013, now Pat. No. 8,745,530, which is a continuation of application No. 10/586,294, filed as application No. PCT/EP2004/014187 on Dec. 13, 2004, now Pat. No. 8,473,863.

(51) Int. Cl.
*G06F 3/048* (2013.01)
*G06F 3/0482* (2013.01)

(52) U.S. Cl.
CPC ............................ *G06F 3/0482* (2013.01)
USPC ................................................. 715/810

(58) Field of Classification Search
USPC .................... 715/768, 810, 828, 841
See application file for complete search history.

(56) References Cited

U.S. PATENT DOCUMENTS

| | | | |
|---|---|---|---|
| 5,434,626 A | 7/1995 | Hayashi et al. | |
| 5,721,848 A | 2/1998 | Joseph | |
| 5,751,980 A | 5/1998 | Musashi et al. | |
| 5,929,857 A * | 7/1999 | Dinallo et al. | 715/840 |
| 5,977,976 A | 11/1999 | Maeda | |
| 6,246,401 B1 | 6/2001 | Setogawa et al. | |
| 6,271,805 B1 | 8/2001 | Yonezawa | |

(Continued)

FOREIGN PATENT DOCUMENTS

| | | |
|---|---|---|
| EP | 0737006 | 10/1996 |
| EP | 0738078 | 10/1996 |

(Continued)

OTHER PUBLICATIONS

Tanaka. "Power Up Visual Basic Net", Advanced Course, Publisher: Ohmsha Ltd., Author: Tooru Tanaka, pp. 87-97, Publication Date Aug. 23, 2002. Place of publication: Japan.

*Primary Examiner* — Thanh Vu
(74) *Attorney, Agent, or Firm* — Robert D. Shedd; Paul P. Kiel; Xiaoan Lu

(57) ABSTRACT

A method for generating an on-screen menu comprising menu buttons and other menu items, e.g. help text, is characterized in that one or more groups of menu buttons or menu items are defined, wherein a group comprises one or more menu buttons or menu items and has associated a defined area on the screen. A state is assigned to a button, the state being "enabled" or "disabled", wherein only an enabled button or item may be displayed, and wherein within a group not more than one button or item may be enabled. The state of a button can be changed by commands associated with other buttons.

4 Claims, 10 Drawing Sheets

(56) References Cited

U.S. PATENT DOCUMENTS

| | | |
|---|---|---|
| 6,389,221 B1 | 5/2002 | Saeki et al. |
| 7,168,050 B1 | 1/2007 | Kwon et al. |
| 7,191,411 B2 | 3/2007 | Moehrie |
| 2002/0085037 A1 | 7/2002 | Leavitt et al. |
| 2002/0133635 A1 | 9/2002 | Schechter et al. |
| 2003/0194212 A1 | 10/2003 | Akita et al. |
| 2003/0196165 A1 | 10/2003 | Jung et al. |
| 2004/0003400 A1 | 1/2004 | Camey et al. |
| 2004/0047588 A1 | 3/2004 | Okada et al. |
| 2005/0183040 A1 | 8/2005 | Kondo et al. |

FOREIGN PATENT DOCUMENTS

| | | |
|---|---|---|
| EP | 0920017 | 6/1999 |
| JP | 61194569 | 8/1986 |
| JP | 05075939 | 3/1993 |
| JP | 8339663 | 12/1996 |
| JP | 09212323 | 8/1997 |
| JP | 2004007518 | 1/2001 |
| JP | 2001067766 | 3/2001 |
| JP | 2001275089 | 10/2001 |
| JP | 2001307412 | 11/2001 |
| JP | 2001312880 | 11/2001 |
| JP | 2001332006 | 11/2001 |
| JP | 2002124069 | 4/2002 |
| JP | 2002230891 | 8/2002 |
| JP | 2002313029 | 10/2002 |
| JP | 2003046951 | 2/2003 |
| JP | 2003069933 | 3/2003 |
| JP | 2005523555 | 8/2005 |
| JP | 2005531975 | 10/2005 |
| WO | WO8301204 | 4/1983 |
| WO | WO03005337 | 1/2003 |
| WO | WO2004003791 | 1/2004 |

\* cited by examiner

METHOD FOR GENERATING AN ON-SCREEN MENU

RELATED APPLICATIONS

This application is a continuation of co-pending U.S. application Ser. No. 13/900,666, filed May 23, 2013, which is a continuation of U.S. application Ser. No. 10/586,294, filed May 18, 2007, now U.S. Pat. No. 8,473,863, which is a 371 of International Application No. PCT/EP2004/014187, filed Dec. 13, 2004, which claims priority to European Application No. EPO4090035.9, filed Feb. 4, 2004, and European Application No. EPO4090010.2, filed Jan. 14, 2004, herein incorporated by reference.

FIELD OF THE INVENTION

This invention relates to a method for generating an on-screen menu.

BACKGROUND

Audio-visual contents of data storage media, e.g. Digital Versatile Discs (DVD) for video applications, usually contain menu data for various applications, e.g. to enable a user to select specific content of the medium. The menu data are used for rendering the menu on a display screen. Often so-called multi-page menus are used, where each possible state of the menu is represented by a full-screen image that is overlaid as a separate layer to the video picture. The menu layer is usually transparent, except for the displayed menu items.

In state-of-the-art menus the menu items basically consist of a number of buttons and non-button objects. Each button is assigned an on-screen position by the content author and can be navigated and activated by the user, e.g. via a remote control. Each button is associated a state, which can either be the 'normal' (or 'unselected') state, the 'selected' state or the 'activated' state. Each button can provide a different visual representation in each state in order to give the user feedback.

However, these kinds of menus are rather static as there is no way to dynamically add or remove buttons from the screen, without re-rendering the whole screen. For content authors such more sophisticated menu features would be desirable, for example for the design of sub-menus. In such a case, additional buttons dynamically appear and disappear on the screen through user interaction.

The invention provides means to generate such dynamic menus.

SUMMARY OF THE INVENTION

The present invention is based on the assumption that the different menu items and buttons of an on-screen menu are rendered separately, not pagewise, on top of a static or dynamic background that may remain visible. "Rendering" means generating values for display pixels.

According to the invention, each button is assigned an additional state, which can either be the 'enabled' or the 'disabled' state. As a general rule, this state defines the rendering behaviour of the button. Buttons that are in the 'enabled' state are typically displayed on the screen, while buttons that are in the 'disabled' state are not rendered and therefore not displayed. Enabled buttons may also be transparent though.

The user can navigate only buttons that are in the 'enabled' state, and their well known 'normal', 'selected' or 'activated' state is only valid within the 'enabled' state. The user cannot navigate buttons that are in the 'disabled' state. Any attempt to do that is ignored by the decoder according to the invention.

Each button within the menu is assigned an on-screen area and a unique identifier. Usually the on-screen area of buttons will be rectangular, or a combination of rectangular partial areas.

According to the current invention, buttons are organized in groups, and all buttons obey to certain rules, which are described in the following.

The number of buttons belonging to one button group can be one or more. There are no empty button groups.

A button cannot belong to more than one button group.

The on-screen area of any button belonging to a first button group does not overlap with the on-screen area of any other button that is not belonging to the same button group.

Each button within a button group must be in one of the two states: 'enabled' or 'disabled'.

Each button is assigned an initial state, which is either the 'enabled' or the 'disabled' state.

Not more than one button within a button group can be in the 'enabled' state at a time, i.e. rendered on the screen. Note that the 'enabled' state does not imply user-visibility; e.g. an enabled button is not visible to the user if it is represented only through transparent pixels.

For each button within a button group neighbourhood information for button navigation can be defined, saying e.g. which other button to select when the user presses the LEFT, RIGHT, UP or DOWN button. This neighbourhood information is only valid when the button is in the 'enabled' state. The user cannot navigate to disabled buttons.

The on-screen areas of a first button of a first button group and a second button of the same group, i.e. their visible representations, may overlap. They will not be visible simultaneously since they belong to the same button group, and only one of them can be to in the 'enabled' state at a time.

Further, a new command is defined, based on the invention. This command can e.g. be associated with a button, and it is used to dynamically switch between the 'enabled' and the 'disabled' state of another button. In state-of-the-art menus, activating a button already may encompass the execution of one or more commands. The proposed command is activated in the same way and is therefore compatible with the state-of-the-art framework. Other effects of activating a button are commonly that the button changes its appearance, colour etc.

One aspect of the invention is the definition of a command for enabling or disabling buttons. The information about which button to enable or disable is provided through the button identifier as a parameter of the command. For each button there can be defined one or more button commands that are executed upon activation of the button. The command or set of commands associated with a button is also referred to as a button handler. The execution of button commands is only possible when the button is in the 'enabled' state. There may be 'empty' buttons however that have no associated button command. The disabling of a button may clear the button visibility by substituting it with transparent pixels.

The inventive button command does usually not change the 'enabled' or 'disabled' state of its own button. This means that if an enabled button is activated, the corresponding button command that is executed upon activation may switch the 'enabled'/'disabled' state of other buttons, but it may not switch its own button to the 'disabled' state, except when its button handler has already scheduled the selection of another button. There may however other commands be executed that comprise e.g. disabling the whole menu. Enabling one button of a group implicitly disables all other buttons within that group.

For each button group a display area is defined where its buttons may be rendered. This area is in the following called a button group area. It is usually rectangular, but can in principle have other shapes. The visible button may have any shape as long as it is within its respective button group area. E.g. it is possible to render a circular button within a rectangular area. The screen pixels that belong to a button group area, but not to an enabled button within said button group area, are rendered transparent.

For button group areas according to the invention it is characteristic that no possible button position within a button group may overlap with any possible button position of another button group, so that the button group areas of different button groups may not overlap at all.

This means that the screen can be considered as a number of non-overlapping button group areas. When the state of any of the buttons of a button group changes, the decoder according to the invention reads the position of the respective button group area from a storage medium, usually an internal memory, and then re-renders the area. For each group only the enabled button is rendered, wherein the corresponding button group area may comprise any number of transparent pixels.

Advantageously, re-rendering of a button group area never modifies pixels belonging to any other button group area, since different button group areas may not overlap. This allows easier decoders. Further, it allows easier programming of menus, and particularly easier verification of the respective programming code, e.g. due to static button positions and static neighborhood relations.

In detail, there are three possibilities for button group areas, as described in the following. They are specialized versions of a general case.

The first possibility is the general case as described above, wherein a button group area may comprise several non-overlapping partial areas, and in each button group area a button belonging to the respective button group may be rendered visible. Therefore a button that belongs to a button group is usually associated with one partial area of its button group area, and then not more than one of the partial areas of a button group may contain an enabled button. In principle it is possible though that an enabled button is present in more than one of the partial areas of its button group, so that a single button may consist of several equivalent parts. When the state of any of the buttons of a button group changes, the decoder according to the invention reads the positions of the partial areas of the respective button group from a storage medium and renders all partial areas new. Particularly, it renders not more than one visible button, namely the enabled button.

The second possibility is that a button group area is a contiguous area, e.g. a rectangular area. This means that a cohesive area is defined for each button group, which area comprises all possible positions of buttons belonging to that button group. As mentioned before, the areas that belong to different button groups may not overlap, and the visible button needs not necessarily fill the allowed area, i.e. the button needs not have the size and shape of the button group area, but it must be fully within the area corresponding to its group. Therefore, buttons belonging to different groups may not overlap. Further, it is easy to fully delete a first button belonging to a first button group when displaying a second button belonging to the same button group, because in this case only the button group area belonging to the respective button group needs to be re-rendered, which is a single contiguous area; it is not necessary to re-render other parts of the screen. Thus, no remains of the previously shown button are visible. All buttons within a button group use the same on-screen area. This is the preferred possibility.

The third possibility is that all buttons of a button group have identical areas, i.e. button size and position on the screen. This is the easiest case, with respect to decoder implementation, menu programming and verification, because rendering a button that belongs to a certain button group necessarily deletes another button of the same button group that was previously visible on the same position. Though it provides a less flexible menu than the other two possibilities.

In principle a button group can also contain non-button objects, i.e. menu items that are visible but not selectable. A non-button object that belongs to a button group has a state assigned, the state being 'enabled' or 'disabled', and can be rendered visible only if it is enabled. Enabling and disabling is done through button handlers associated with menu buttons.

The invention provides more sophisticated menu features, as e.g. demanded by content authors, which features allow easy decoding. In particular, the invention provides means to generate dynamic menus, wherein buttons can be dynamically removed or added to a menu.

With the invention, a content author is able to easily define hierarchical menus and sub-menus being represented by a flat data structure. Particularly the programming and verification of menus is easier than with known methods. An advantage of the invention is that the graphics decoder needs not consider the whole menu for any menu operation, but it may simply handle isolated button groups instead. The data that describe the initial menu structure are read from a storage medium, usually a removable storage medium, e.g. optical disc, and are then stored on a temporary storage medium, e.g. memory, which is connected to the decoder. When the menu is operated, the variables within the temporary storage hold the current state.

When a button is invisible, this can either mean that it is disabled and can therefore not be selected or activated, or it is enabled and marked invisible, e.g. has a special flag or only transparent pixels. In the latter case it can be selected, and usually will be automatically activated upon selection, so that associated commands are executed and a visible button is selected. It is also possible to concatenate invisible buttons, as long as the last button command selects a visible button.

Claim 1 discloses a method for generating a menu using such button groups. An apparatus that utilizes the inventive method is disclosed in claim 2. A storage medium holding a respective data structure is disclosed in claim 3. A method for recording a respective data structure on a storage medium is disclosed in claim 4.

Further objects, features and advantages of the invention will become apparent from a consideration of the following description and the appended claims when taken in connection with the accompanying drawings.

BRIEF DESCRIPTION OF THE DRAWINGS

Exemplary embodiments of the invention are described with reference to the accompanying drawings, which show in FIG. 1 a menu screen with disabled submenus.

DETAILED DESCRIPTION OF THE INVENTION

Figure 1:
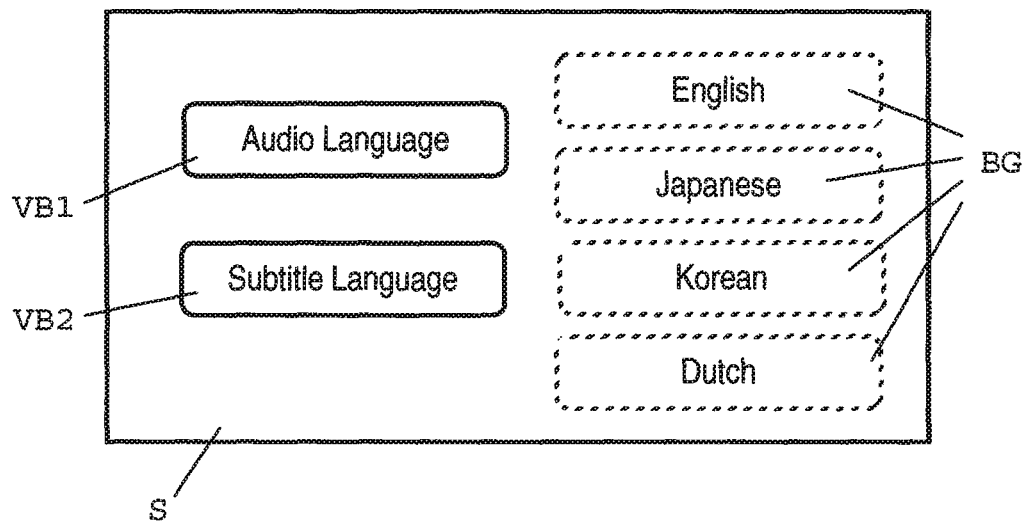

FIG. 1 shows the initial view of a menu page on a display screen S, with only an "Audio Language" button VB1 and a "Subtitle Language" button VB2 enabled and visible. The other buttons BG belong to submenus of either of the visible buttons and are invisible, as defined through a data-segment that describes the menu and that is contained in a bitstream on the medium. According to the invention, these buttons BG belong to separate button groups and are initially disabled, and thus invisible. Moreover, also the two visible buttons VB1,VB2 may belong to separate button groups. The data segment can be called interactive composition segment (ICS). In the initial view shown in FIG. 1 none of the visible buttons VB1,VB2 is activated. Usually one of the visible buttons is initially selected by default. If in the shown case the user presses e.g. the RIGHT button on the remote, nothing would change because there is no button activated yet. Generally, if neighbourhood relations are defined that lead to disabled buttons, the decoder ignores the relations as long as the neighbour buttons are disabled. Pressing e.g. the UP or DOWN button would select either of the visible buttons VB1,VB2. Activating the "Audio Language" button VB1 by selecting the button VB1 and pressing on a remote e.g. an "OK" button would lead to a menu display modification, as shown in FIG. 2.

Figure 2:
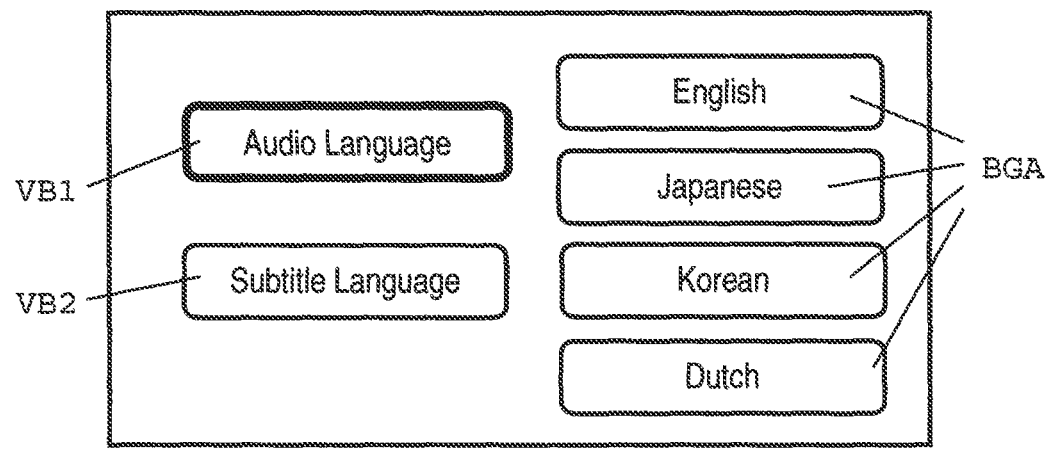
FIG. 2 a menu screen with enabled first submenu.

In FIG. 2 the "Audio Language" button VB1 is activated, and the button commands associated with it enable the buttons BGA to the right. Consequently, these buttons BGA are rendered visible, allowing to select and activate one of them, and thus to select an audio language.

Figure 3:
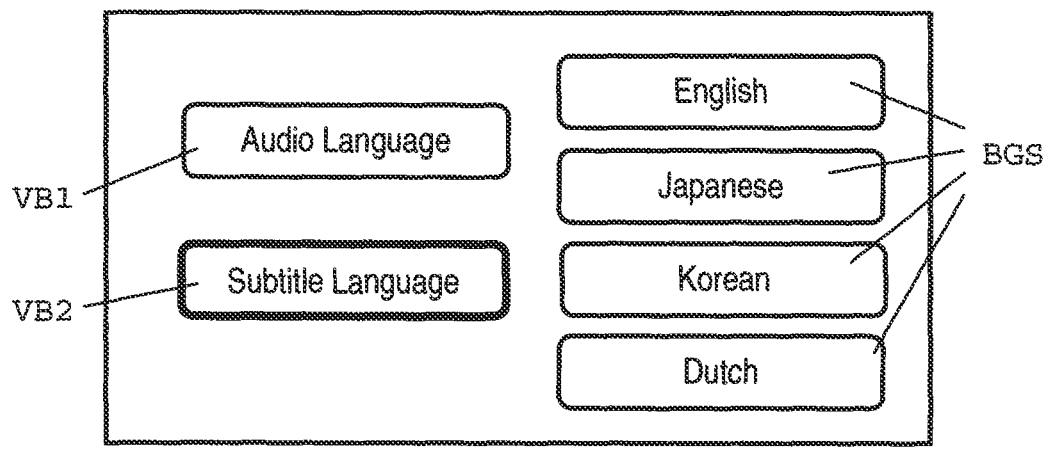
FIG. 3 a menu screen with enabled second submenu.

FIG. 3 shows a situation where e.g. starting from FIG. 2 the "Audio Language" button VB1 was not activated, but the DOWN button was pressed so that the "Subtitle Language" button VB2 gets selected. Then the "Subtitle Language" button VB2 was activated e.g. by the user pressing an "OK" button on the remote control. The effect is that the four buttons BGS to the right are rendered, presenting subtitle options, and in particular these buttons are rendered in the same positions as the four buttons BGA to the right were rendered for audio options in FIG. 2. This corresponds to the third possibility for positioning buttons of button groups, as described above, since buttons that have the same position but belong to different submenus belong to the same button group. The buttons BGS shown in FIG. 3 are different from the buttons BGA shown in FIG. 2, since they have different functions, namely allow selection of a subtitle language. The buttons BGS represent the "Subtitle" range of buttons for each of the button groups, while the buttons BGA in FIG. 2 represent the "Audio" range of buttons of the same button groups. In this particular example, not only the position but also the appearance and the languages of the corresponding buttons of the shown submenus are the same. E.g. in FIG. 3, only from the selected button VB2 is visible to which submenu the buttons BGS refer. Therefore, when one of the submenu buttons BGS is selected, the corresponding superior button VB2 should look different from an unselected button, though it is neither selected nor activated.

Figure 4:
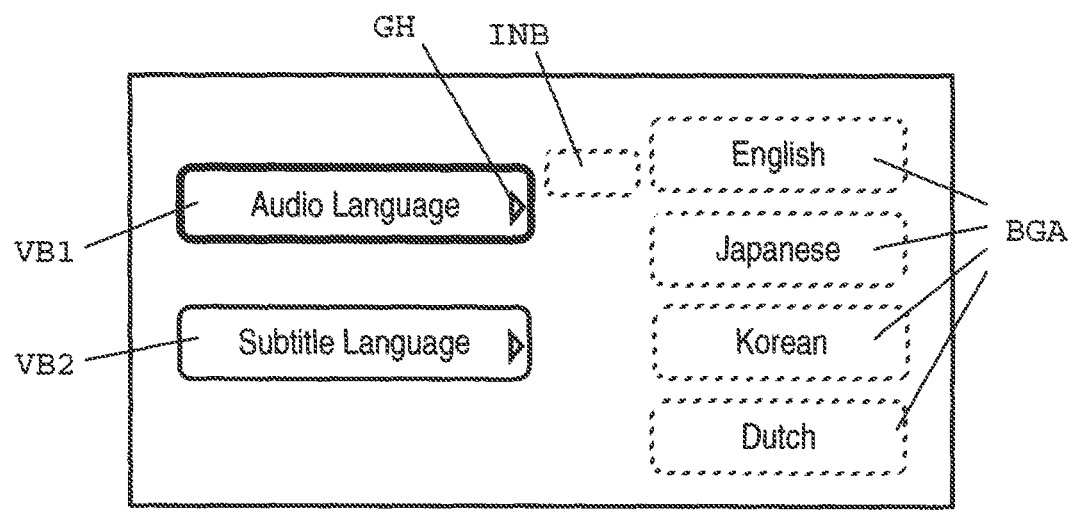
FIG. 4 an authoring option for submenu selection.

FIG. 4 shows a menu where a graphical user hint GH, in the form of a small arrow, appears in the visible buttons VB1, VB2, showing that related submenus exist. When the "Audio Language" button VB1 is activated or when it is selected and the RIGHT button is pressed on the remote, then its button handler selects an invisible button INB being defined in the neighbourhood information of the "Audio Language" button VB1 as neighbour to the right. The invisible button INB is a so-called auto-action button, since it automatically switches from the selected state to the activated state, so that its button handler is executed. The button handler comprises a command to render the four buttons BGA on the right visible, without any of them being activated, and a command to select the "English" button. The invisible button INB has the same data structure as the other buttons. If the RIGHT button is pressed while the "Audio Language" button is selected, the audio options become visible.

Figure 5:
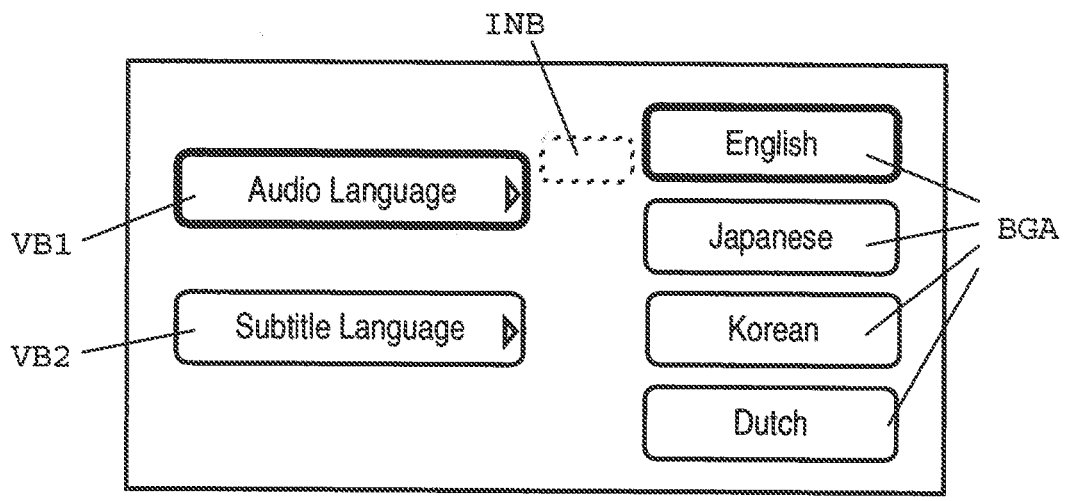
FIG. 5 a menu screen with selected submenu item.

In the next step, one of the new buttons on the right can be selected, as shown in FIG. 5. There are four different button groups BGA, namely 'English', 'Japanese', 'Korean' and 'Dutch'. Further, it is possible that the "Audio language" and the "Subtitle Language" buttons belong to button groups. It is also possible though to combine button groups and single buttons. From the data structure point of view, single buttons may also form a button group with only one element. In the situation depicted in FIG. 5, the "Audio Language" button looks selected or activated, and for each of the submenu button groups BGA the buttons representing the options for audio are enabled and visible. They are rendered at the same positions where also the buttons for subtitle options would be rendered, if the "Subtitle Languages" were selected. Therefore the buttons belonging to the same button group are overwriting each other. One of the submenu buttons is selected, and therefore the "Audio Language" button must be deselected, as described later for FIG. 23. The selected submenu button can be a default button, e.g. 'English' is a predefined default, or it can be the currently used option, or any other type of default.

Figure 6:
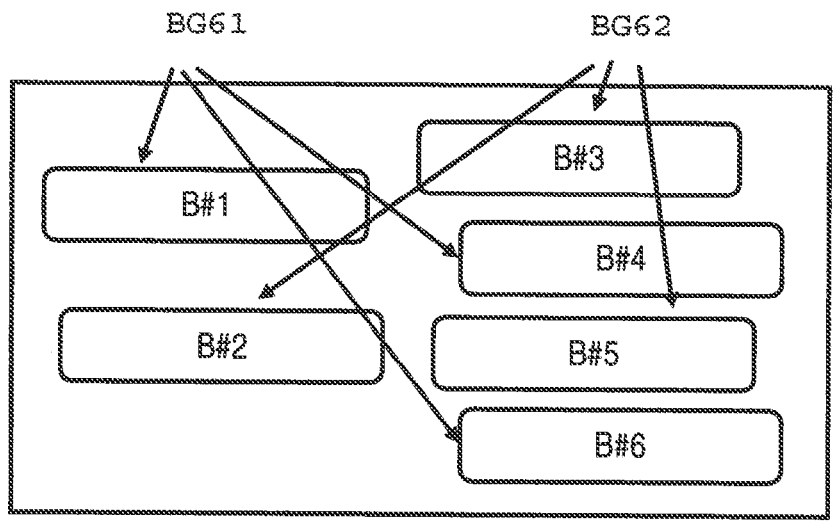
FIG. 6 a button group area according to first possibility.
Figure 7:
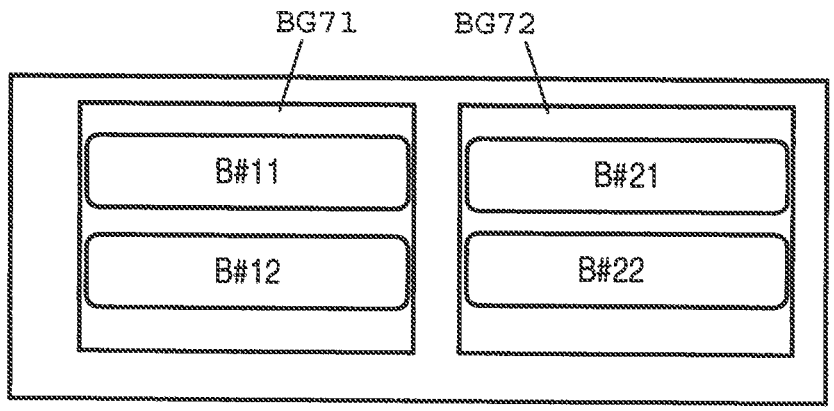
FIG. 7 a button group area according to second possibility.
Figure 8:
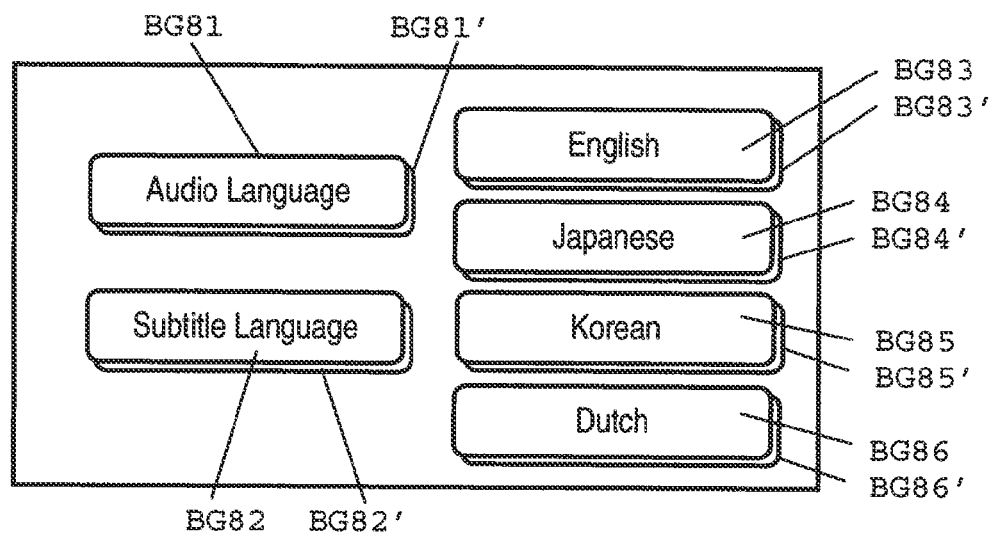
FIG. 8 a button group area according to third possibility.

FIG. 6-8 show examples for the three above-mentioned possibilities for defining button group areas. The area of a button group is generally defined through the sum of all on-screen areas of the buttons that belong to that button group. Further, the position of different buttons that belong to the same button group may differ, as long as they are within the area specified for their button group. For practical reasons, i.e. due to the column and row structure of a typical display, the button group area and partial areas will usually be rectangular, though they can in principle have any shape.

FIG. 6 shows the first possibility for definition of a button group, as described above. A first button group BG61 comprises three buttons B#1,B#4,B#6 with three separate, non-coherent areas. A second button group BG62 also comprises three buttons B#2,B#3,B#5 with three separate, non-coherent areas. According to the definition of button groups, not more than one button per button group BG61,BG62 is enabled at a time, and may be visible. Thus, only one of the buttons B#1, B#4 and B#6, and only one of the buttons B#2,B#3,B#5 may be enabled (and visible) at a time, while the others are rendered transparent. Further, none of the individual button areas of the first button group BG61 may overlap with any individual button area from the other button group BG62. It is possible though to surround, even fully surround, a button group area of a first button group with partial areas belonging to a second button group. In this example, the enabled and visible buttons fully cover their respective button group areas. In another embodiment though it would be possible that areas of buttons that belong to the same group may overlap, e.g. B#2 and B#5. This is because they may not be visible at the same time, and when one of them is rendered visible, all partial areas of the button group area are re-rendered and thus cleared, i.e. rendered transparent.

FIG. 7 shows the preferred embodiment, where a single area is defined for every button group, and all buttons belonging to that button group are positioned within that area. A button group BG71 has a defined area where all its buttons B#11,B#12 are rendered. Another button group BG72 has another area for its buttons B#21,B#22. Also here, button group areas of different button groups may not overlap. The position of different buttons B#11,B#12 that belong to the same button group BG71 may differ, as long as they are within the specified area.

FIG. 8 shows a special case of the preferred embodiment, where all buttons of each button group have exactly the same position, thus overwriting each other. Therefore, the area of a button is identical with the button group area in this case. A first button group comprises an enabled, and therefore visible, "Audio Language" button BG81 and one or more disabled, invisible buttons BG81'. Though the disabled buttons BG81' are drawn visible in the figure for clarity, they have exactly the same display position as the visible button BG81.

Figure 9:
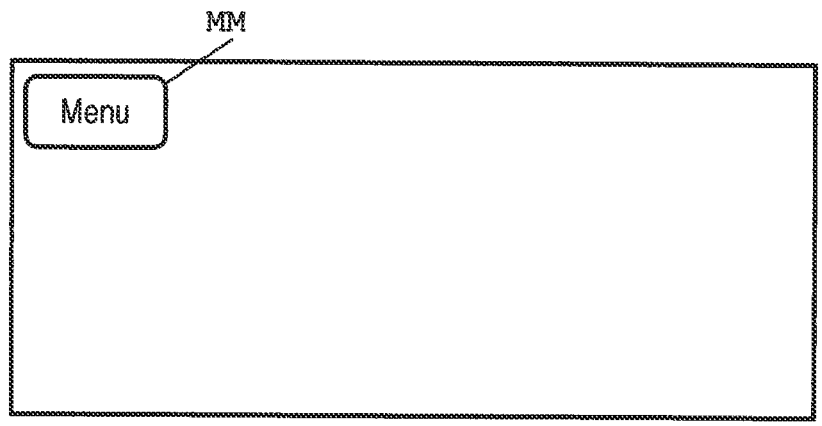
FIG. 9 a screen with menu icon.
Figure 10:
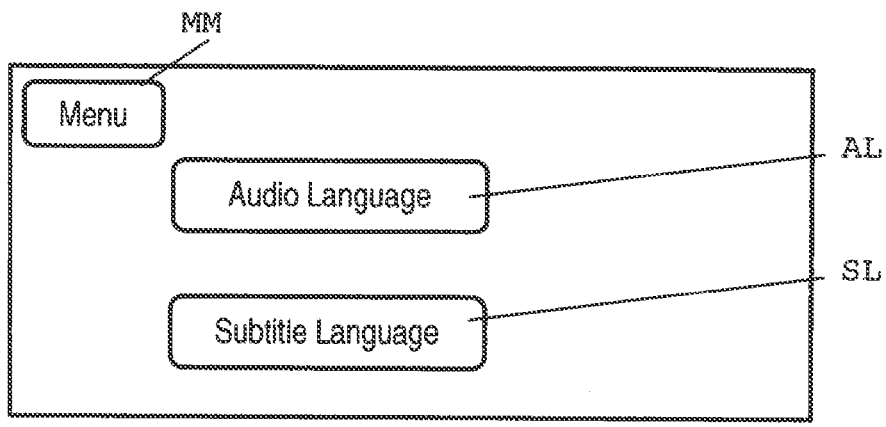
FIG. 10 a screen with menu icon and enabled menu.

FIG. 9 shows an example where a menu is represented only through a menu icon MM, while the rest of the screen shows an audio-visual presentation, e.g. a movie. A small icon MM is displayed on the screen, indicating that a menu is available. The icon MM does not disturb the viewer who is watching a movie. When the viewer activates the menu, e.g. through pressing either a dedicated button or the "OK" button on the remote control, further buttons of the menu are revealed, as shown in FIG. 10. The user can operate the menu to make selections, e.g. select an audio language or a subtitle language with respective buttons AL,SL. If e.g. the "Audio Language" button AL is selected and activated, an audio language submenu is rendered visible, as shown in FIG. 1. It may comprise e.g. the "Audio Language" button AL1, to indicate the current position within the hierarchical menu, and initial language option buttons L1, . . . , L4 for English, Japanese, Korean and Dutch. The "Audio Language" button AL1 has an indication MI1 for indicating that further options exist. In this example, the further options can be accessed by repeated activation of the "Audio Language" button AL. This is called multi-activation. If this button AL is activated a second time, audio language buttons L5, . . . , L8 for Spanish, French, Greek and Polish appear, and after a third activation there are audio language buttons L9, . . . , L12 for Danish, Norwegian, Finnish and Swedish. After a fourth activation of the "Audio Language" button AL however the initial menu is displayed again, as shown in FIG. 10. The menu can be iconified again with the dedicated menu button.

Although the viewer has the impression that only the text within the option buttons changes, it is technically difficult and error-prone to program such a menu with known methods and data structures. In particular, for the verification of the programmed menu data it is necessary to test all possible combinations of buttons, in order to be sure that the menu works correctly. An implementation using button groups according to the invention is advantageous, because the menu needs to be verified with only one button from each button group, and the button group mechanism can be verified separately, only once. Further, it is easy for the menu programmer to rearrange the options, and thus modify the button groups.

In the described example, a first button group comprises the buttons for English L1, Spanish L5 and Danish L9. A second button group comprises the buttons for Japanese L2, French L6 and Norwegian L10.

A third button group comprises the buttons for Korean L3, Greek L7 and Finnish L11.

A fourth button group comprises the buttons for Dutch L4, Polish L8 and Swedish L12.

Those buttons of the different button groups that are enabled and visible at the same time can be regarded as a logical layer, though from the data structure point of view they are independent from each other. They are only at the same time enabled and visible.

Figure 11:
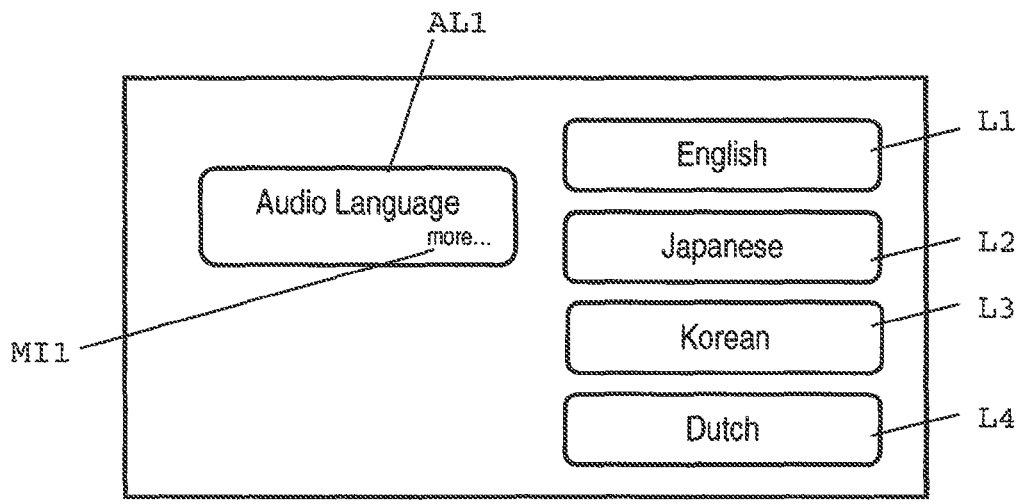
FIG. 11 an initial multi-activation menu screen after first activation of a feature type button.
Figure 12:
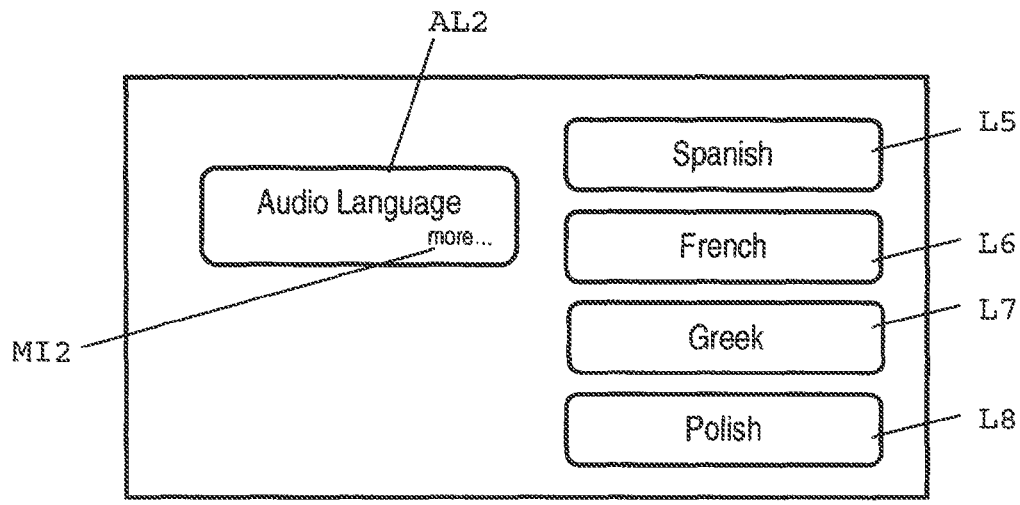
FIG. 12 a multi-activation menu screen after second activation of a feature type button.
Figure 13:
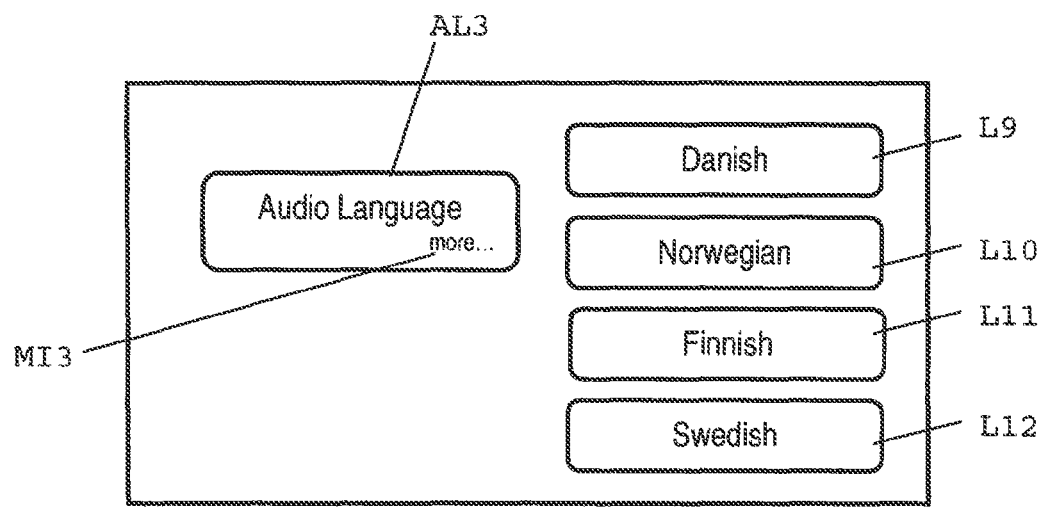
FIG. 13 a multi-activation menu screen after third activation of a feature type button.

But also the "Audio Language" button AL is not a single button, since depending on the current state of the other menu buttons it has different functions. Particularly, the functions differ in which option buttons must be enabled upon activation of the current "Audio Language" button. E.g. activation of the "Audio Language" button AL1 in FIG. 11 causes that the option buttons L5, . . . , L8 shown in FIG. 12 are enabled, while activation of the identical-looking "Audio Language" button AL2 in FIG. 12 causes that the option buttons L9, . . . , L12 shown in FIG. 13 are enabled. Therefore, a fifth button group may comprise the different "Audio Language" buttons AL1,AL2,AL3 that belong to the logical layers. Alternatively, it is possible that the "Audio Language" buttons AL1,AL2,AL3 are identical, and the button command takes into account which button from the button groups are currently enabled, and the command enables the next element from each button group.

Figure 14:
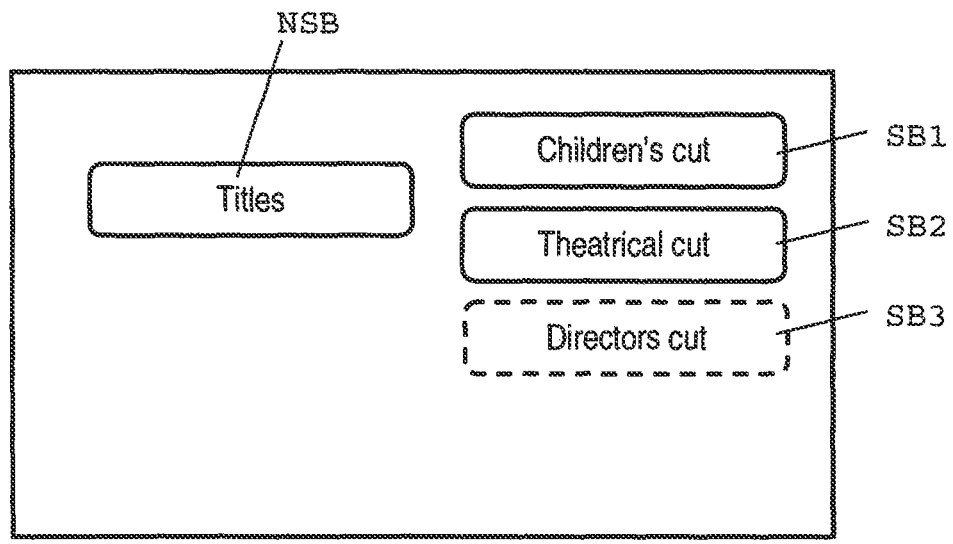
FIG. 14 a menu screen with conditionally enabled item.

FIG. 14 shows an example for conditional enabling. Buttons can be enabled or disabled depending on user settings or player settings. E.g. there can be three versions of a movie on a disc: a 'children's cut', a 'theatrical cut' and a 'directors cut'. When the disc is inserted into the player, the initial menu may show a non-selectable button NSB with e.g. the title of the movie, and three selectable buttons SB1,SB2,SB3 for the reproduction options. A user can however set a parental level, and thus allows the 'children's cut' and the 'theatrical cut', but rejects the 'directors cut'. The screen may then show only two selectable buttons SB1,SB2 for the two allowed options. For the forbidden option however there is no visible button available, since it is rendered transparent.

According to the invention, this menu behaviour can be technically achieved by using enable/disable commands and button groups. One or more of the option buttons SB1,SB2, SB3 may belong to separate button groups, and according to specified settings for each button group a defined member is enabled and rendered visibly. In the current example, the "Director's cut" button belongs to a button group SB3 according to the invention, with an associated button group area, and the parental level setting of the player causes the initial button handler to disable the respective button, i.e. to render the button group area transparent. Also other setting types can be utilized, e.g. reproduction options depending on player type, audio equipment type etc.

As a further embodiment of the invention, so-called breadcrumb menus can easily be constructed. Breadcrumb menus are generally menus where the previously pressed button that belongs to another hierarchy remains visible, so that the user can see which button was selected, and to what the currently displayed option buttons refer. This is particularly useful for hierarchical menus. In the data structure utilized by the invention, hierarchy is given implicitly by neighbourhood relations.

Figure 15:
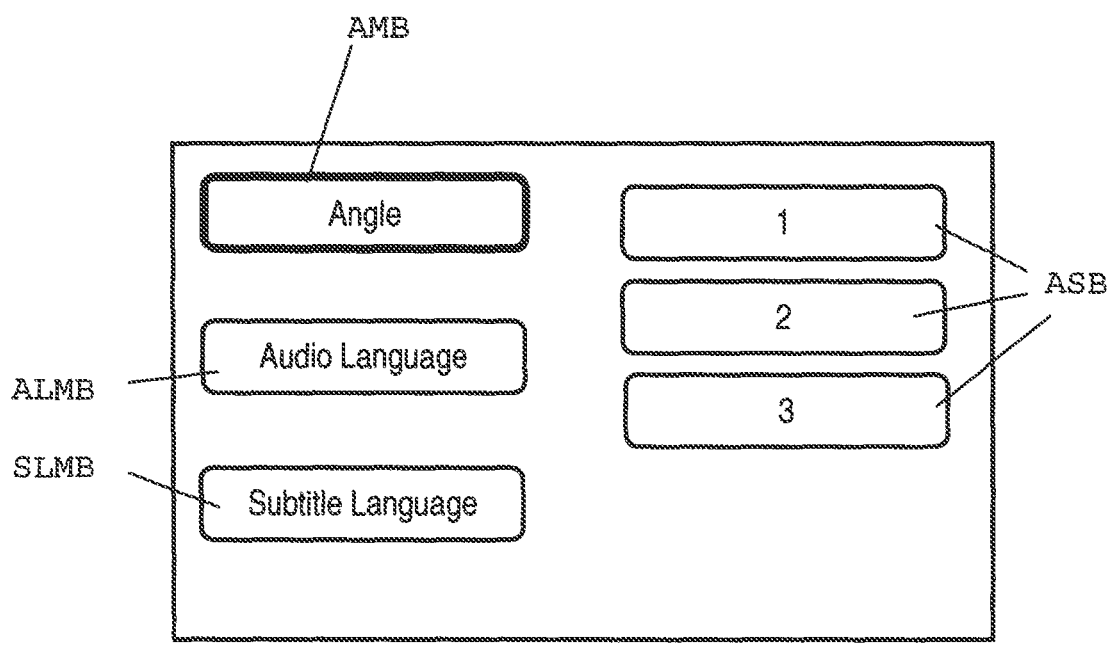
FIG. 15 initial view of a breadcrumb menu.

FIG. 15 shows a menu screen with three buttons AMB, ALMB,SLMB that belong to the same hierarchical level. One of the menu buttons AMB is for multi-angle selection. It is selected, and three angle select option buttons ASB are displayed on the right. Each of these visible option buttons ASB belongs to a separate button group and was rendered visible because the "Angle" menu button AMB is selected. The other members of these button groups are disabled and thus invisible.

Figure 16:
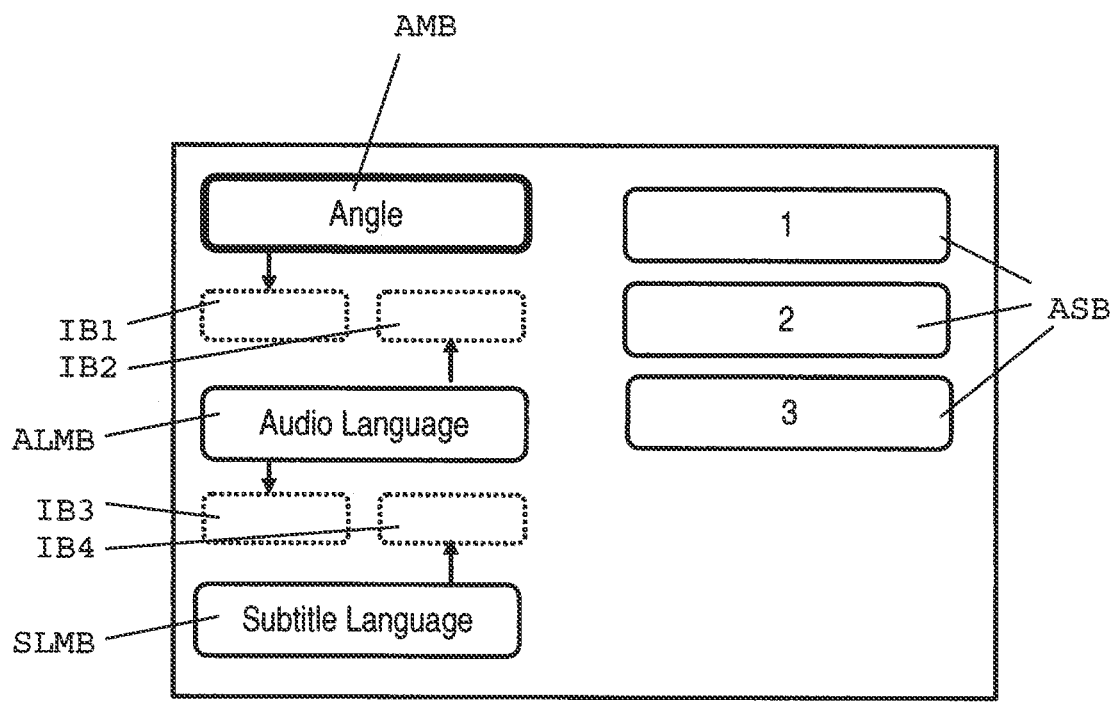
FIG. 16 buttons included in initial view of a breadcrumb menu.

FIG. 16 shows that the menu comprises also other, invisible buttons IB1, . . . , IB4. These are used to define what should happen at transitions between the higher level menu buttons AMB,ALMB,SLMB.

Figure 17:
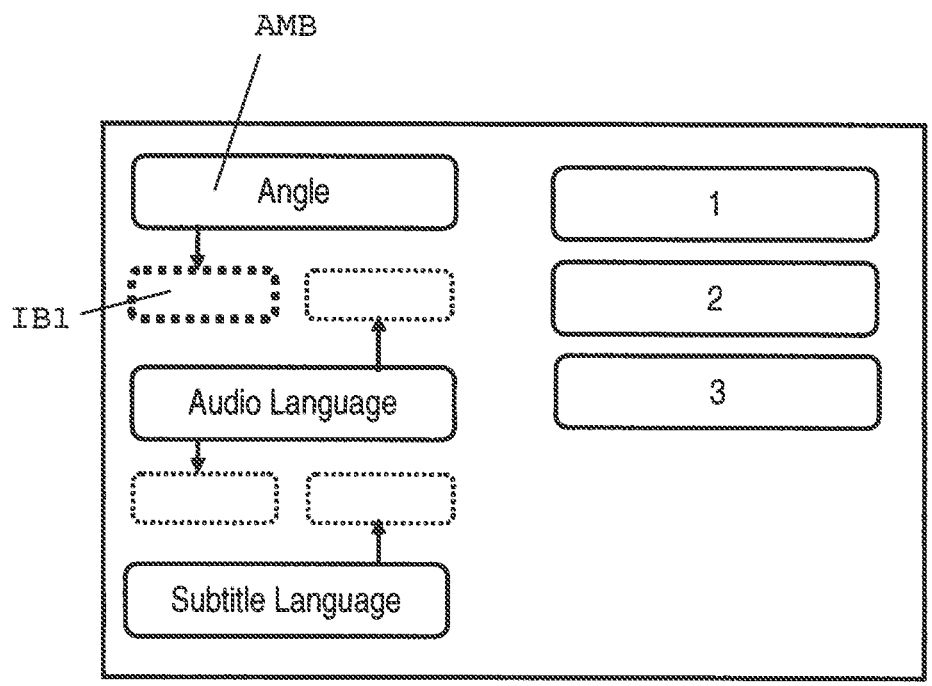
FIG. 17 and FIG. 18 transition from first to second view in breadcrumb menu.

When the "Angle" menu button AMB is selected, like in FIG. 15, and the user wants to select the "Audio Language" menu button ALMB, he presses the DOWN button on his remote, because the "Audio Language" menu button ALMB is displayed below the "Angle" menu button AMB. A dynamic menu, as supported by the invention, may perform the following: First, the button that is defined as DOWN neighbour of the "Angle" button is selected, which is in this example an invisible button IB51. This is the state shown in FIG. 17. Although invisible buttons are not represented on the display, they may have a display area or position assigned due to data consistency, e.g. if the same data structure is used for visible and invisible buttons. For illustrative purpose however the figures show also invisible buttons, at their logical positions.

Figure 18:
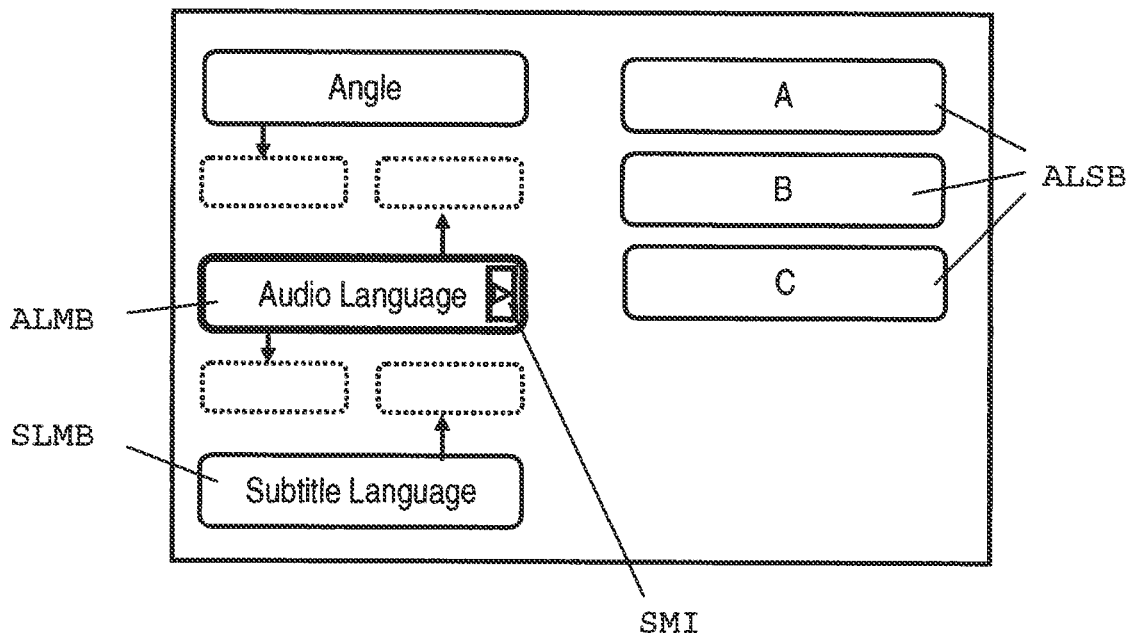
Figure 19:
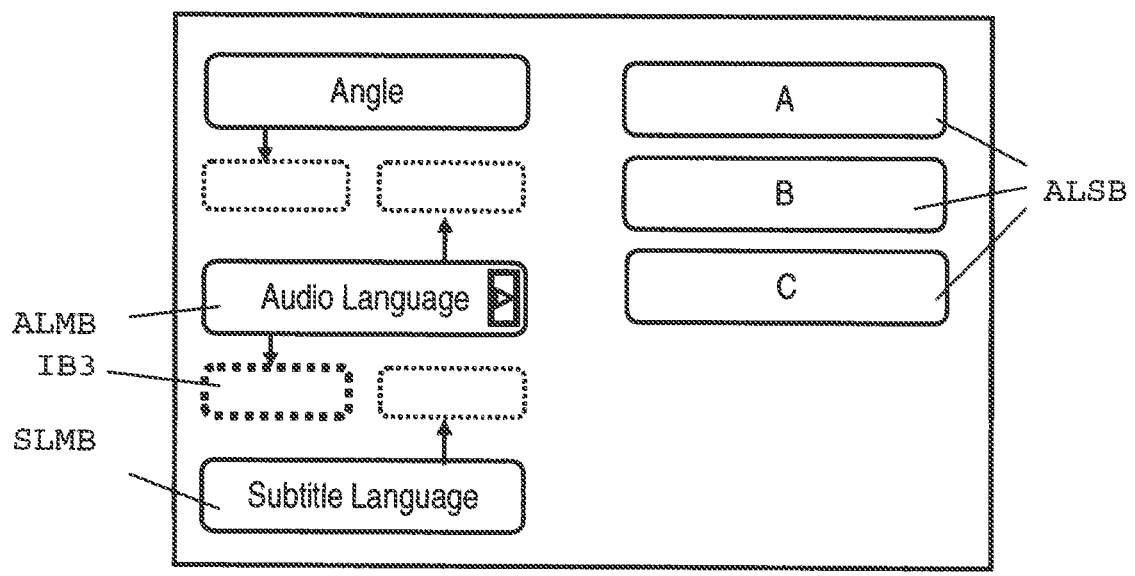
FIG. 19 and FIG. 20 transition from second to third view in breadcrumb menu.
Figure 20:
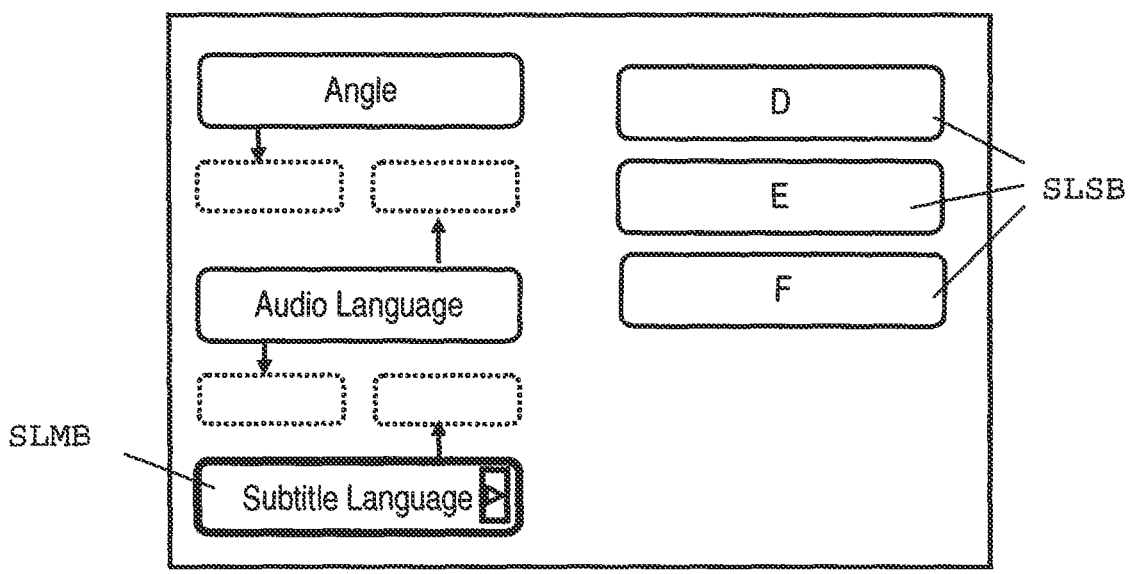

Then, after the invisible button IB1 was selected, it is automatically activated (auto_action_flag==true in Tab.1), and its button handler executes the following commands: first it disables the menu option buttons ASB relating to the "Angle" menu button AMB, thus making them invisible, second it enables the option buttons ALSB that belong to the menu button the user wants to select, which is the "Audio Language" menu button ALMB, and finally it selects the "Audio Language" menu button ALMB, thereby deselecting itself. This is shown in FIG. 18. FIG. 19 and FIG. 20 show the corresponding transition from the "Audio Language" menu button ALMB to the "Subtitle Language" menu button SLMB using another invisible button IB3, wherein the audio language submenu buttons ALSB are replaced by subtitle language submenu buttons SLSB. Further, there are invisible buttons IB2,IB4 for the opposite transitions.

As a result, the menu option buttons ASB,ALSB,SLSB always match the selected menu button AMB,ALMB,SLMB without the selected menu button being activated. The user may not perceive the intermediate states, the invisible buttons or the short time the described transitions take, usually in the range of milliseconds. According to the invention, the menu option buttons ASB,ALSB,SLSB are implemented as members of button groups. Buttons on the same position that belong to different submenus form a button group. This allows an easy menu data structure and therefore simplified programming and verification. In particular, button groups may implicitly handle the disabling of obsolete submenu option buttons and the enabling of the correct submenu option buttons that belong to the newly selected menu button. Since not more than one button from a button group may be enabled, and therefore visible, it is sufficient to select for each button group the new button to be enabled. This implicitly disables the previously enabled button of the group, and the pixels that belong to the button group area are overwritten according to the bitmap representation of the new button. The rest of the display may remain unchanged. Therefore there is no need for the decoder to analyse which buttons were visible before, which button must be replaced, which area it occupied and if any button areas overlap.

Figure 21:
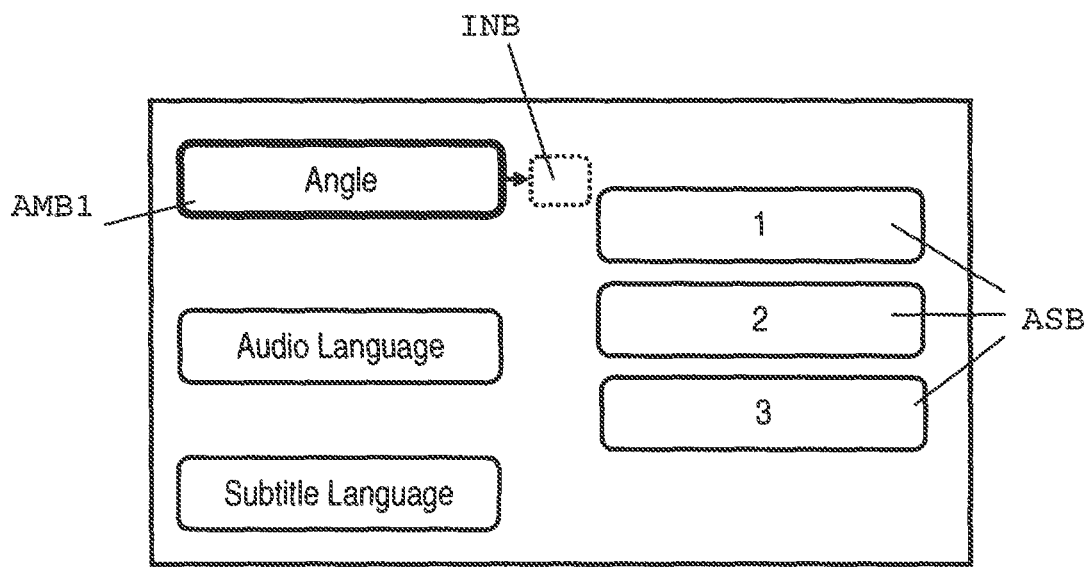
FIGS. 21, 22 and 23 appearances of selected and unselected, but previously selected, buttons in breadcrumb menu, during transition to submenu.
Figure 22:
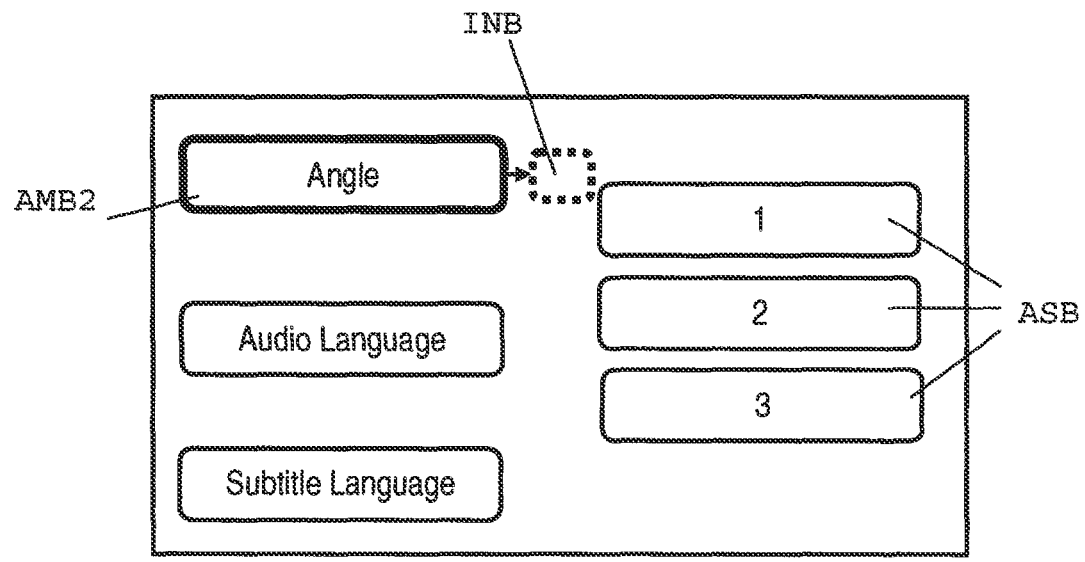
Figure 23:
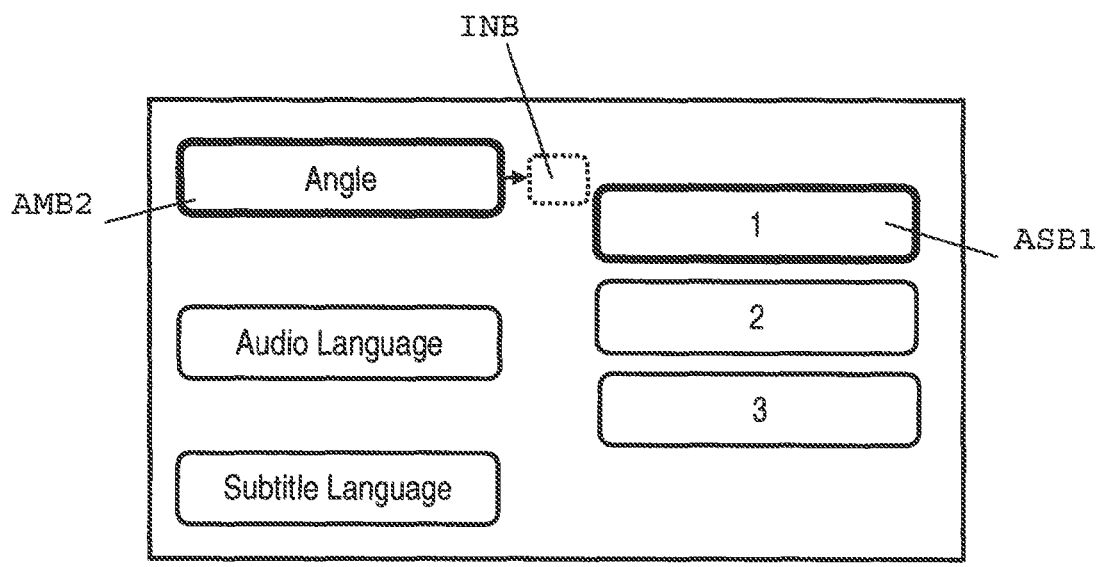

Another embodiment of the invention, being an exemplary implementation of the above-described breadcrumb effect, is shown in FIG. 21-23. When a hierarchical menu button is selected, e.g. the "Angle" menu button AMB1 in FIG. 21, it changes from the normal state to the selected state, and its representation looks different, e.g. highlighted. This is caused by different bitmap representations corresponding to the states of a button. When the "Angle" menu button AMB1 is activated, it remains only a very short time in the activated state. Its appearance during this time may differ from the selected state, but the user will hardly see it. When the button is activated, its button handler may select an invisible button INB that is used to render the submenu buttons ASB visible, as described above. This situation is shown in FIG. 22. At this time, when the invisible button INB is in the selected state, the "Angle" menu button is not selected, since only one button of the menu can be selected at a time—otherwise the decoder could not detect to which button a user command refers. The "Angle" menu button is in the normal state instead. But in order to achieve the breadcrumb effect, i.e. indicate the menu button to which the current submenu buttons ASB refer, it would be desirable to give the menu button AMB1 another appearance. This can be achieved with the button groups according to the invention, e.g. by generating an "Angle" button group.

The default "Angle" button AMB1, like any menu button, has the three states normal, selected and activated. Another button, e.g. an "Angle_Select" button AMB2 belonging to the same button group looks similar to the default "Angle" button AMB1 and has the same display position, but differs slightly. E.g. its normal state bitmap may be the same as the default buttons selected or activated state bitmap. As described before, the invisible button INB is automatically activated upon selection. It may e.g. render the submenu buttons ASB visible, then enable the "Angle_Select" button AMB2 (in the normal state), thus implicitly disabling the previously visible "Angle" button AMB1, and finally select one of the submenu buttons ASB1, thus deselecting itself. This is shown in FIG. 23. The effect is that the user may recognize the button AMB2 as the same button AMB1 like before, and that the button AMB2 looks selected or activated, but actually it is deselected. This allows giving a button virtually more different representations than states, e.g. colours, shapes, text etc., by replacing it with other buttons. The inventive button groups allow an easy handling of these buttons, and provide a simple mechanism to determine the correct values for pixels within the button group area.

The group structure provides information for the menu decoder, the information defining which on-screen area needs update. Because within a button group not more than one button is active at a time, the activation of another button within a group implies the deactivation of the first button of the same group. This is an advantage for authoring, since it makes it easier to author menus.

Especially in the case of prerecorded media, e.g. prerecorded Blu-ray discs, a verification process is performed on any title before it is released to check if the data-structure meets the specification. The invention allows for easy verification while providing enhanced features to the content author when creating dynamic menus.

In the following, the syntax of a data segment shown in Tab.1 is described, which may be contained in a bitstream and describes the initial menu screen, being an exemplary implementation. It describes the case that the button group area is defined according to the second possibility described above.

TABLE 1

Exemplary Syntax of data segment describing a menu

| Syntax | No. of bits | Mnemonics |
|---|---|---|
| 1 interactive_composition_segment( ) { | | |
| 2   segment_type | 8 | bslbf |
| 3   segment_length | 16 | uimsbf |
| 4   composition_number | 16 | uimsbf |
| 5   composition_state | 2 | bslbf |
| 6   reserved | 6 | bslbf |
| 7   command_update_flag | 1 | bslbf |
| 8   reserved | 7 | bslbf |
| 9   composition_time_out_pts | 33 | uimsbf |
| 10   reserved | 7 | bslbf |
| 11   selection_time_out_pts | 33 | uimsbf |
| 12   reserved | 7 | bslbf |
| 13   UO_mask_table( ) | 64 | bslbf |
| 14   animation_frame_rate_code | 8 | uimsbf |
| 15   default_selected_button_number | 8 | uimsbf |
| 16   default_activated_button_number | 8 | uimsbf |
| 17   while (processed_length < segment_length) { | | |
| 18     button_group( ) { | | |
| 19       button_group_horizontal_position | 16 | uimsbf |
| 20       button_group_vertical_position | 16 | uimsbf |
| 21       button_group_horizontal_size | 16 | uimsbf |
| 22       button_group_vertical_size | 16 | uimsbf |
| 23       default_enabled_button_number | 8 | uimsbf |
| 24       num_buttons | 8 | uimsbf |
| 25       for (i=0; i<num_button;i++) { | | |
| 26         button_number | 8 | uimsbf |
| 27         numerically_selectable_flag | 1 | bslbf |
| 28         reserved | 7 | bslbf |
| 29         auto_action_flag | 1 | bslbf |
| 30         reserved | 7 | bslbf |
| 31         button_horizontal_position | 16 | uimsbf |
| 32         button_vertical_position | 16 | uimsbf |
| 33         neighbor_info( ) { | | |
| 34           upper_button_number | 8 | uimsbf |
| 35           lower_button_number | 8 | uimsbf |
| 36           left_button_number | 8 | uimsbf |
| 37           right_button_number | 8 | uimsbf |
| 38         } | | |
| 39         normal_state_info( ) { | | |
| 40           start_object_id_normal | 16 | bslbf |
| 41           end_object_id_normal | 16 | bslbf |
| 42           repeat_normal_flag | 1 | bslbf |
| 43           reserved | 7 | bslbf |
| 44         } | | |
| 45         selected_state_info( ) { | | |
| 46           start_object_id_selected | 16 | bslbf |
| 47           end_object_id_selected | 16 | bslbf |
| 48           repeat_selected_flag | 1 | bslbf |
| 49           reserved | 7 | bslbf |
| 50         } | | |
| 51         actioned_state_info( ) { | | |
| 52           start_object_id_activated | 16 | bslbf |
| 53           end_object_id_activated | 16 | bslbf |
| 54         } | | |
| 55         num_of_button_commands | 8 | uimsbf |
| 56         for( cmd_id = 0; cmd_id < num_of_button_commands; cmd_id++ ) { | | |
| 57           button_command[cmd_id] | 96 | bslbf |
| 58         } | | |
| 59       } | | |
| 60     } | | |
| 61   } | | |
| 62 } | | |

The notation used in Tab.1 uses while-loops and for-loops. Loops however are only a means to generalize the notation, since the actual bitstream will include data for the single passes or instances of the loop.

Between 1.17 and 1.61 is a loop over the complete data segment of length segment_length. A data segment may include any number of button groups.

In 1.18 is defined that the following lines, until 1.60, refer to the definition of a button group. The identifier of the group is the value given in round brackets. In 1.19-22 the respective position on the screen is defined for the current button group, also referred to as button group area in this application. It is defined by its horizontal and vertical size and the position of its reference point. In this case the button group area is only one rectangular, but as described before it may be other areas or a plurality of rectangulars. In that case 1.19-22 would be repeated once for each partial area.

The parameter in 1.23 defines which of the buttons of the current group is enabled by default. The decoder uses this value to initially load a register that relates to the current group and holds a variable. This variable specifies the number of the currently enabled button, and can be modified during operation of the menu. It may also be assigned a value that corresponds to none of the buttons, so that all buttons of the group are disabled. This mechanism ensures that not more than one button within a group is enabled. Two other parameters that are used to initialize variables that may be modified during menu operation are default_selected_button_number (1.15) and default_activated_button_number (1.16).

In 1.24 the number of buttons in the current group is defined.

The loop beginning in 1.25 covers all buttons of the group and defines for each button a reference number (1.26), if it is numerically selectable (1.27), if it automatically executes its commands when it is selected (1.29), its position within the button group area (1.31-32), its neighbour buttons (1.33-38), and address ranges indicating where the bitmap representations corresponding to the different buttons states can be read. For every button, one or more commands can be defined. The number of commands of the current button is specified in 1.55 by the parameter num_of_button_commands. The actual commands of the button handler are defined in 1.56-58.

The invention is usable for all kinds of presentation devices that have access to a display and contain a decoder for processing menu data structures read from e.g. DVDs, Blu-ray discs or other media. Further, the invention is usable for generating such data structures.

According to the invention, a decoder for decoding a data stream, the data stream comprising menu data for a visually displayable menu, and the menu comprising separately rendered menu items including selectable menu buttons, includes (i) means for defining at least one group of menu items, the group comprising one or more menu items, wherein a menu item may not belong to more than one group, (ii) means for associating to said group a defined area on the display, and (iii) means for assigning a state to each of said menu items belonging to a group, the state being "enabled" or "disabled", wherein only an enabled menu item may be displayed, and wherein not more than one menu item within a group may be enabled simultaneously.

Further, a displayed menu item that belongs to a group is displayed within the area associated with said group, wherein the areas of different groups may not overlap and no display pixel may belong to more than one group.

Further, a menu item may have an associated command, which is executed upon activation of the menu item and comprises enabling or disabling of another menu item.

The invention claimed is:

1. A method for generating a displayable menu page from data of a menu data segment, the menu page comprising separately rendered selectable menu buttons, comprising:

accessing definition of at least one group of two or more menu buttons from the menu data segment, wherein the definition of the at least one group in the menu data segment comprises a parameter indicating the number of menu buttons in a respective group of the at least one group, and wherein each of the two or more menu buttons has associated a defined area on a display and for each of the menu buttons a numerically_selectable_flag is defined, and each menu button that belongs to the displayable menu page is separately rendered, and wherein a menu button belongs to not more than one group of the at least one group; and assigning a state to each separately rendered menu button, the state being "enabled" or "disabled", wherein only an enabled menu button is displayed, wherein a menu button in the "enabled" state may have a further state of "normal", "selected" or "activated", and wherein the menu button is considered to be a same menu button irrespective of its state being the "disabled" state, the "enabled" and "normal" state, the "enabled" and "selected" state or the "enabled" and "activated" state, and wherein not more than one menu button within a group may be enabled simultaneously, and wherein the numerically_selectable_flag indicates if the menu button is numerically selectable.

2. Apparatus for processing a data stream, the data stream comprising menu data for a displayable menu page, wherein the displayable menu page comprises selectable menu buttons to be separately rendered, the apparatus including:

means for separately rendering each menu button that belongs to the displayable menu page;

means for defining, based on data from said data stream, at least one group of two or more menu buttons, wherein a menu button belongs to not more than one group, and for each of the menu buttons a numerically_selectable_flag is defined, and wherein based on the data from said data stream, a parameter indicating the number of menu buttons in a respective group is defined for the at least one group;

means for associating with each of said menu buttons a defined area on a display; and means for assigning a state to each of said separately rendered menu buttons belonging to a group, the state being "enabled" or "disabled", wherein only an enabled menu button is displayed, wherein a menu button in the "enabled" state may have a further state of "normal", "selected" or "activated", and wherein the menu button is considered to be a same menu button irrespective of its state being the "disabled" state, the "enabled" and "normal" state, the "enabled" and "selected" state or the "enabled" and "activated" state, and wherein not more than one menu button within a group may be enabled simultaneously, and wherein the numerically_selectable_flag indicates if the menu button is numerically selectable.

3. A removable data storage medium containing audio-visual data and a menu data segment for generating a displayable menu page relating to the audio-visual data, the menu page comprising separately rendered selectable menu buttons, wherein for the menu data segment at least one group of two or more menu buttons is defined in said menu data segment, wherein a definition of the at least one group in the menu data segment comprises a parameter indicating the number of menu buttons in a respective group of the at least one group, and wherein each of the two or more menu buttons has associated a defined area on a display, and for each of the menu buttons a numerically_selectable_flag is defined, and each menu button that belongs to the displayable menu page is separately rendered;

a menu button belongs to not more than one group of the at least one group;

a state is assigned to each separately rendered menu button, the state being "enabled" or "disabled", wherein only an enabled menu button is displayed, wherein a menu button in the "enabled" state may have a further state of "normal", "selected" or "activated", and wherein the menu button is considered to be a same menu button irrespective of its state being the "disabled" state, the "enabled" and "normal" state, the "enabled" and "selected" state or the "enabled" and "activated" state, and wherein not more than one menu button within a group may be enabled simultaneously, and wherein the numerically_selectable_flag indicates if the menu button is numerically selectable.

4. A method for recording audio-visual data and a menu data segment for generating a displayable menu page relating to the audio-visual data on a removable data storage medium, the menu page comprising separately rendered selectable menu buttons, the method comprising:

creating, in said menu data segment, data for at least one group of two or more menu buttons, wherein a definition of the at least one group in the menu data segment comprises a parameter indicating the number of menu buttons in a respective group of the at least one group, and wherein each of said menu buttons has associated a defined area on a display and for each of the menu buttons a numerically_selectable_flag is defined, and each menu button that belongs to the displayable menu page is separately rendered, wherein a menu button belongs to not more than one group of the at least one group, and wherein upon generating a menu from said menu data segment, a state is assigned to each menu button of said at least one group of menu buttons, the state being "enabled" or "disabled", and wherein only an enabled menu button may be displayed and may have one of the states "normal", "selected" or "activated", and wherein the menu button is considered to be a same menu button irrespective of its state being the "disabled" state, the "enabled" and "normal" state, the "enabled" and "selected" state or the "enabled" and "activated" state, and wherein not more than one menu button within a group may be enabled simultaneously, and wherein the numerically_selectable_flag indicates if the menu button is numerically selectable, and recording said menu data segment and the audio-visual data on said removable data storage medium.

* * * * *